United States Patent [19]

Richard

[11] Patent Number: 4,664,410

[45] Date of Patent: May 12, 1987

[54] SUSPENSION WITH VARIABLE FLEXIBILITY AND DAMPING

[75] Inventor: Denis Richard, Choisi Le Roy, France

[73] Assignees: Automobiles Peugeot, Paris; Automobiles Citroen, Neuilly, both of France

[21] Appl. No.: 772,880

[22] Filed: Sep. 5, 1985

[30] Foreign Application Priority Data

Sep. 6, 1984 [FR] France ................................ 8414078

[51] Int. Cl.$^4$ .............................................. B60G 11/26
[52] U.S. Cl. .................................................. 280/714
[58] Field of Search ................................ 280/708, 714

[56] References Cited

U.S. PATENT DOCUMENTS

| 3,945,664 | 3/1976 | Hiruma | 280/708 |
| 4,377,299 | 3/1983 | Fujii | 280/708 |
| 4,564,214 | 1/1986 | Tokunaga et al. | 280/708 |

Primary Examiner—John J. Love
Assistant Examiner—Kenneth R. Rice
Attorney, Agent, or Firm—Karl F. Ross; Herbert Dubno

[57] ABSTRACT

An oleopneumatic suspension for motor vehicles which has, in addition to the usual suspension cylinder, a hydraulic accumulator and damper for each wheel, a regulator valve for each axle which connects additional dampers to a further hydraulic accumulator for each axle. The additional dampers and hydraulic accumulator are brought into play when the valve is open and are rendered inoperative when the valve is closed. The regulator valve may be operated by other vehicle-operating parameters.

9 Claims, 7 Drawing Figures

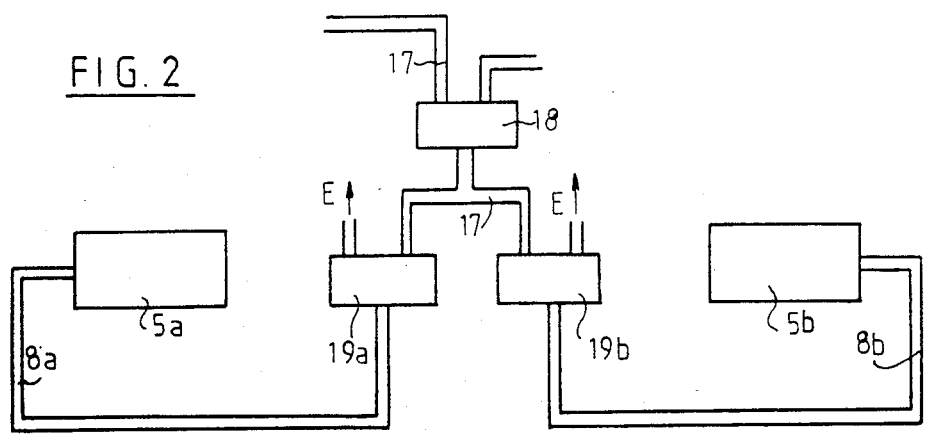
FIG. 2
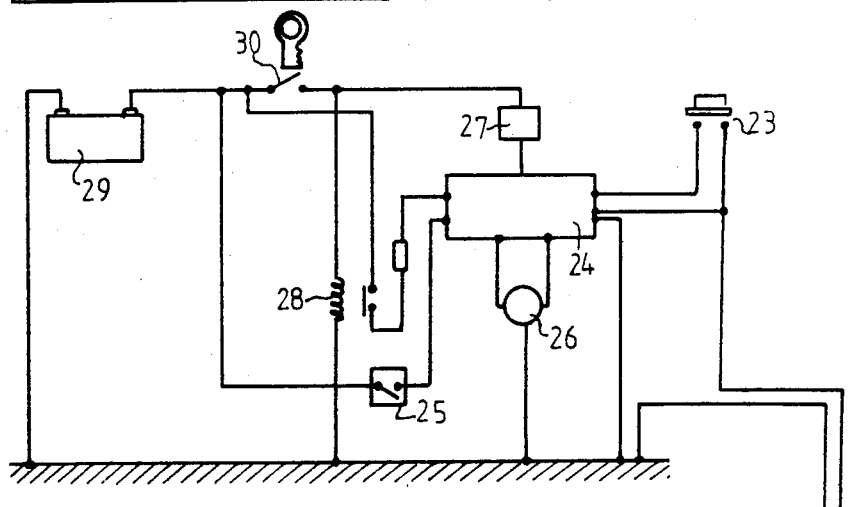
FIG. 3
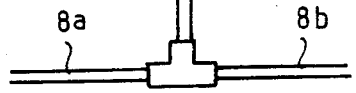

SUSPENSION WITH VARIABLE FLEXIBILITY AND DAMPING

FIELD OF THE INVENTION

The present invention relates to an oleopneumatic suspension for motor vehicles of the kind comprising hydraulic cylinders interposed between the structure of the vehicle and the wheel support arms, these cylinders being connected hydraulically by means of dampers to oleopneumatic accumulators.

BACKGROUND OF THE INVENTION

Oleopneumatic suspensions of this kind have already been proposed, comprising, for each wheel of the vehicle, a cylinder, an accumulator and damping means, as well as additional accumulators and means for connecting or disconnecting these additional accumulators to or from the hydraulic circuit so as to introduce or remove an additional elasticity.

SUMMARY OF THE INVENTION

The present invention provides a suspension of the above type comprising, for each axle, an additional oleopneumatic accumulator cooperating with a first additional damper connected to the cylinder of one of the wheels of the axle and with a second additional damper connected to the other wheel of the axle, and means for switching the accumulator and the two additional dampers into or out of the circuit.

Each axle may be equipped with a slide suspension regulator adapted for switching the accumulator and two additional dampers of the axle into or out of the circuit under the effect of a hydraulic pressure acting simultaneously or separately on the regulators of the two axles of the vehicle.

Each axle may be equipped with a trim corrector adapted for connecting the suspension cylinders to the high pressure or to the exhaust depending on the load of the vehicle, the suspension regulator being equipped with means so that the trim corrector may act on the two cylinders of the axle when the accumulator and the two additional dampers are in circuit or out of circuit.

The pressure acting simultaneously, or separately in accordance with a variant of the invention, on the two suspension regulators may be controlled by two series connected electromagnetic valves, each having two stable states and cooperating with a centrifugal regulator so that the accumulators and the additional dampers are connected or disconnected depending on the speed of the vehicle and on the energization states of the manually controlled electromagnetic valves.

In a variant the pressure acting on the suspension regulators may be controlled by an electromagnetic valve controlled from an electronic box depending on the state of different driving parameters such as braking, acceleration or rotation of the steering wheel with the possibility of manual intervention for stiffening the suspension.

BRIEF DESCRIPTION OF THE DRAWING

Different embodiments of the suspension of the invention will be described hereafter by way of non limitative examples with reference to the accompanying drawing in which:

FIGS. 2 and 3 show details of variants;

SPECIFIC DESCRIPTION

Figure 1A:
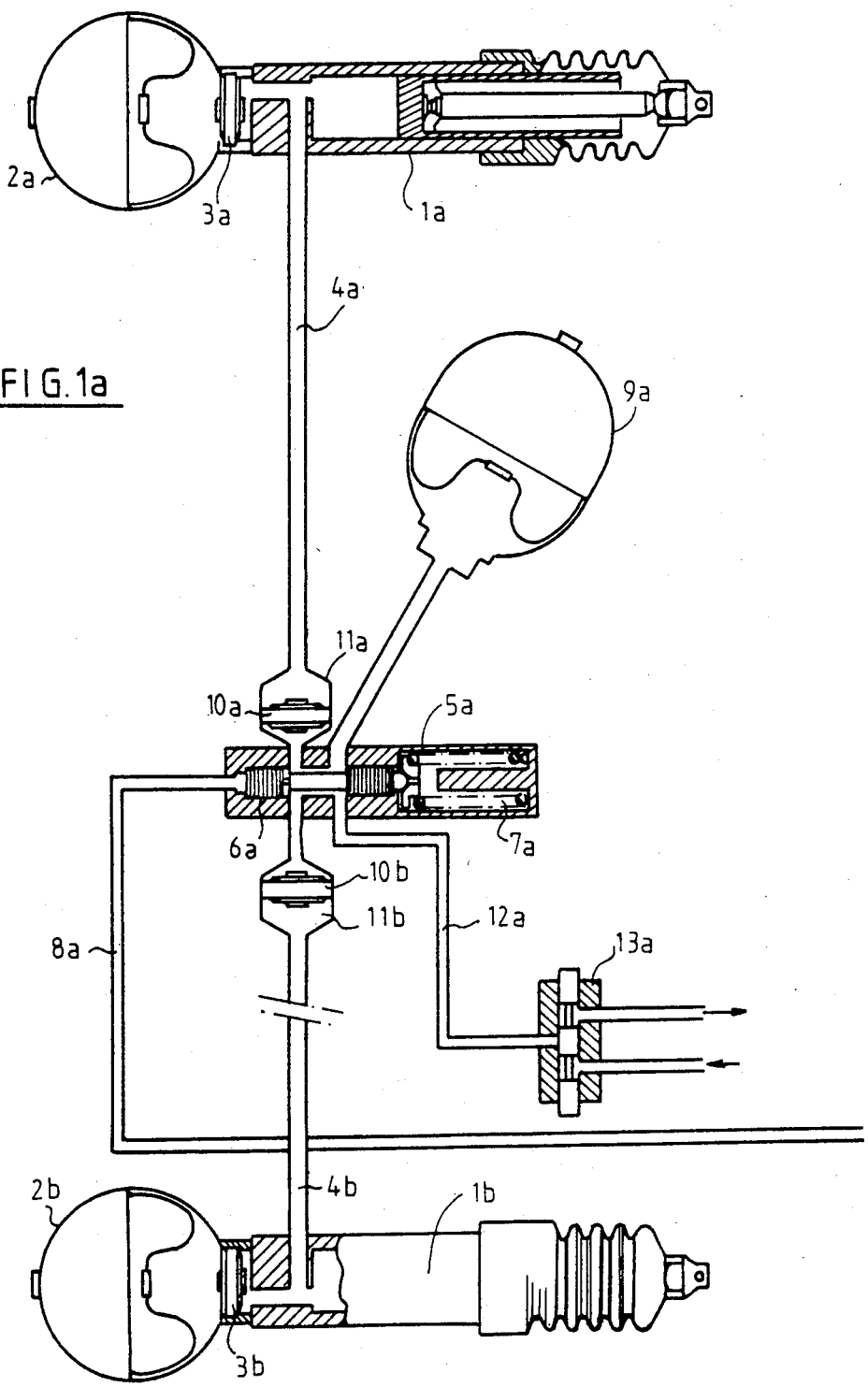
FIGS. 1a and 1b are parts of a diagram of the first embodiment of the suspension.
Figure 1B:
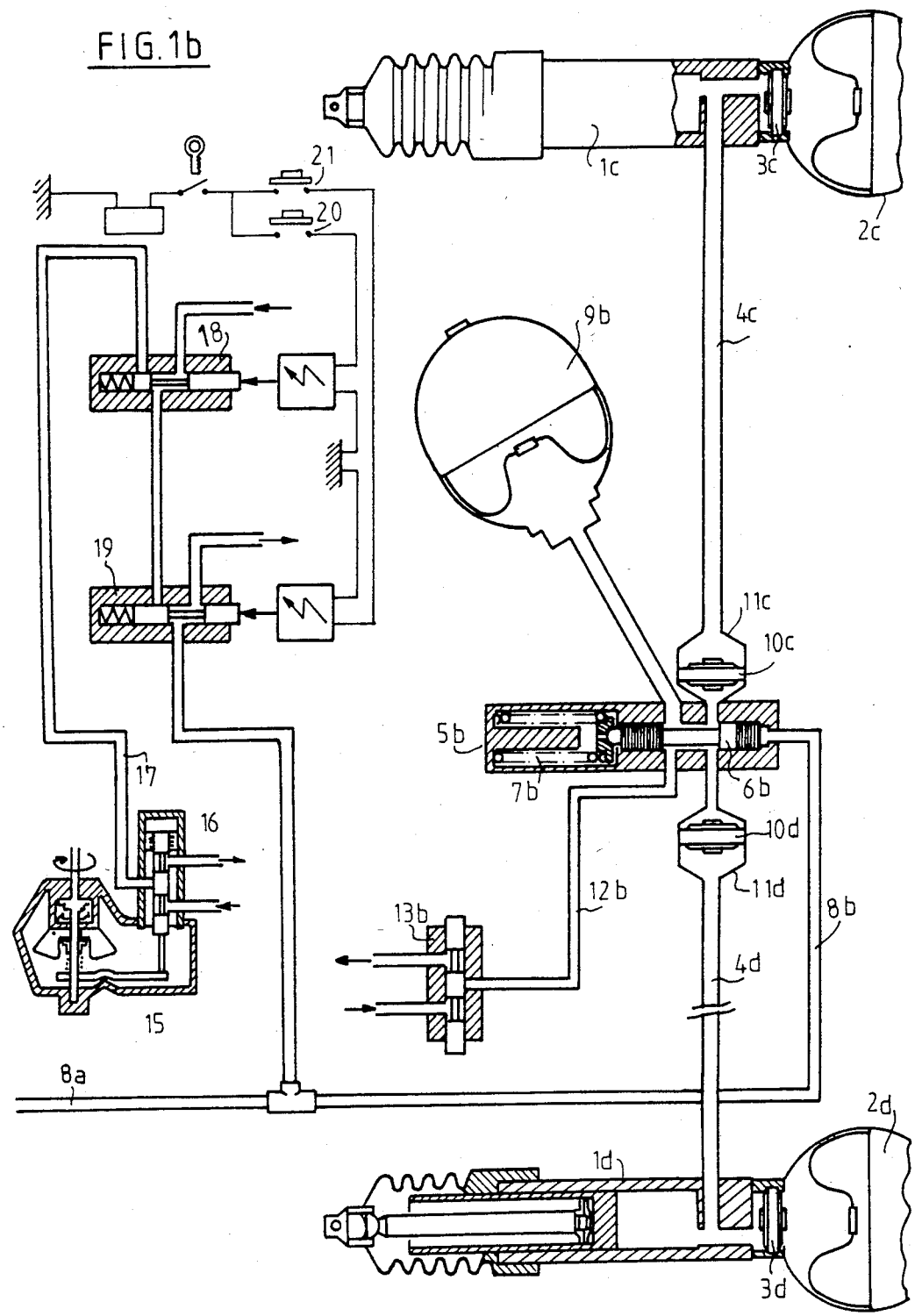

FIGS. 1a and 1b show a suspension cylinder 1a associated with the right hand wheel of the front axle, a suspension cylinder 1b associated with the left hand wheel of this front axle, a suspension cylinder 1c associated with the right hand wheel of the rear axle and a suspension cylinder 1d associated with a left hand wheel of this rear axle. Each cylinder cooperates with an oleopneumatic accumulator 2a, 2b, 2c or 2d and a damper 3a, 3b, 3c or 3d disposed in the oil circuit, between the oleopneumatic accumulator and the pressurized chamber of the cylinder. A duct 4a, 4b, 4c or 4d connects the pressurized chamber of the cylinder to one of two additional damping and flexibility devices associated one with the front axle and the other with the rear axle.

Each additional damping and flexibility device comprises a regulator 5a or 5b formed mainly from a slide valve 6a, or 6b which may move against a spring 7a or 7b under the effect of a hydraulic pressure arriving through a duct 8a or 8b and capable of isolating duct 4a, 4b, 4c or 4d when this pressure has a high value or connecting them to oleopneumatic accumulators 9a or 9b when this pressure is low.

Dampers 10a, 10b, 10c and 10d are housed in chambers 11a, 11b, 11c and 11d interposed between the suspension regulators 5a and 5d and ducts 4a, 4b, 4c and 4d so that when the pressure drops in ducts 8a and 8b and when, for this reason, the slide valves 6a, and 6b are pushed back by springs 7a and 7b, additional damping and flexibility are introduced into the circuits of each suspension cylinder, the two circuits of each axle being connected together by a single oleopneumatic accumulator by means of two independent dampers. The additional damping and flexibility device thus comprises additional damping for each wheel and an additional accumulator for each axle.

Figure 6:
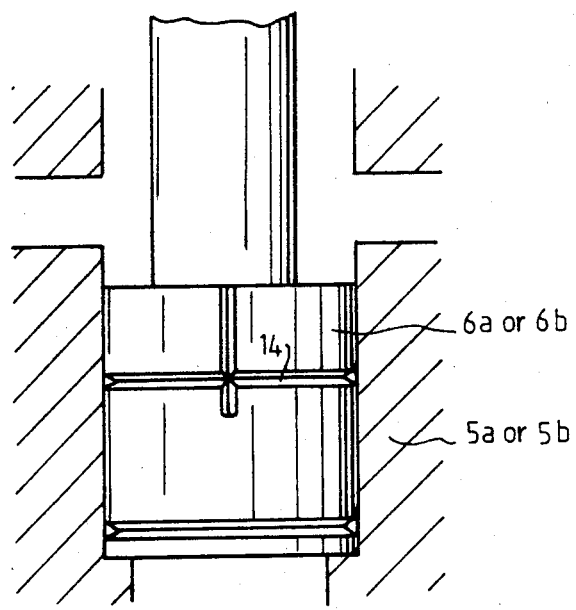
FIG. 6 is an enlarged view of the slide valve of the suspension regulator.

A duct 12a or 12b connects each suspension regulator 5a or 5b to a height corrector 13a or 13b which directs pressurized liquid towards the suspension cylinder depending on the load on the axle. When the pressure in ducts 8a and 8b pushes back slide valves 6a and 6b and when the additional flexibility and damping are eliminated, the height correction must be able to come into play. For this, the slide valve 6a, or 6b comprises a T shaped groove 12 which, when the slide valve is closed, connects together the height corrector and the suspension cylinders (FIG. 6). This groove has a width and a depth of the order of a few tenths of a millimeter so that it does not modify the flexibility and damping characteristics of the axle when the slide valve 6a or 6b is closed.

A centrifugal regulator 15 acts, depending on the speed of the vehicle, on a pressure regulator 16 connected to the exhaust and to the high pressure and maintains a regulated pressure depending on the speed in duct 17. This duct 17 passes through a first electromagnetic valve 18 and through a second electromagnetic valve 19 and joins ducts 8a and 8b again which control the suspension regulators 5a and 5b.

Electromagnetic valve 18 is a pressure selection electromagnetic valve and it chooses between the pressure defined by the centrifugal regulator 15 and the high pressure. Electromagnetic valve 19 is a stop-start electromagnetic valve; when it is at rest, ducts 8a and 8b are connected to the exhaust side so that the additional flexibility and damping devices are brought into service. On the other hand, when valve 19 is energized, the suspension is stiffened under the effect either of the high pressure or of the pressure regulated by the centrifugal regulator, depending on the state of electromagnetic valve 18.

Two push buttons 20 and 21 fixed on the dash board provide manual control of the electromagnetic valves 18 and 19. When button 21 is not pressed in, the suspension is soft, when push button 21 is pressed in and when button 20 is not, it is firm; when the two push buttons are pressed in, the operation is automatic, the suspension stiffening when the speed of the vehicle increases.

In the variant shown in FIG. 2, the electromagnetic valve 19 is replaced by two electromagnetic valves 19a and 19b controlled by two independent push buttons; with this arrangement the front and rear suspensions may be made independent.

In the variant shown in FIG. 3, electromagnetic valves 18 and 19 are replaced by a single electromagnetic valve 22, controlled either by a push button 23 which allows selection between a firm suspension when the push button is pressed in and a suspension depending on the driving parameters when the push button is released, or by an electronic unit 24.

The electronic unit 24 delivers a pulse which energizes electromagnetic valve 22, either when a brake pressure 25 or steering wheel rotation 26 sensor exceeds a threshold, or if the acceleration sensor 27 detects a signal. Relay 28 feeds unit 24 from the battery 29 as soon as contact 30 is made. When pushbutton 23 is released, the suspension is normally soft; it becomes firm when the braking or acceleration reaches a given value or else when the amplitude of rotation of the steering wheel exceeds a given value.

Figure 4:
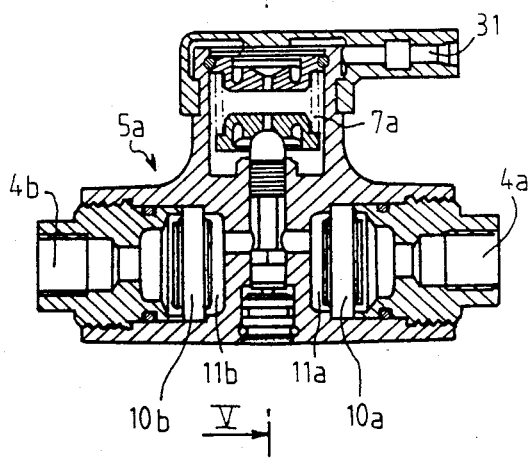
FIGS. 4 and 5 show in section the suspension regulator respectively taken along IV—IV of FIG. 5 and line V—V of FIG. 4.
Figure 5:
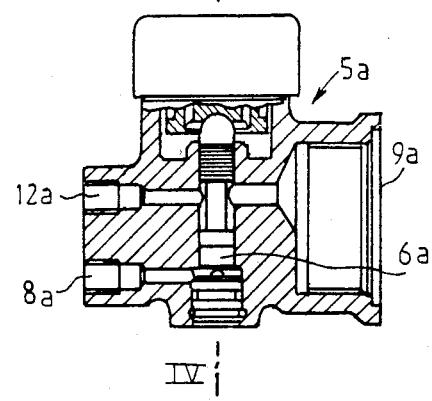

FIGS. 4 and 5 show detail views of the suspension regulator 5a. The additional accumulator 9a and the additional dampers 10a and 10b of the axle are combined in a single piece.

The connections to accumulator 9a, to ducts 4a and 4b, to ducts 12a of the trim corrector and to duct 8a can be seen. Connection 31 serves for recovering leaks or sweating of the slide valve. The suspension regulator 5b is of identical construction.

What is claimed is:

1. An oleopneumatic suspension for a motor vehicle comprising, for each wheel, a cylinder provided with an accumulator and damping means for each axle, an additional oleopneumatic accumulator cooperating with a first additional damper connected to the cylinder of one of the wheels of the axle and with a second additional damper connected to the cylinder of the other wheel of the axle, and means for switching the accumulator and the two additional dampers into or out of circuit, each axle being equipped with a slide valve suspension regulator adapted for switching the accumulator and the two additional dampers of the axle into or out of circuit under the effect of the same hydraulic pressure acting simultaneously against resilient means on the two regulators of the front axle and of the rear axle, wherein the slide valve of the suspension regulator has a T shaped groove establishing a hydraulic connection between the trim corrector and the suspension cylinders when the slide valve of the suspension regulator is in a closed position, said T shaped groove being sufficiently narrow so as not to appreciably influence the flexibility and damping characteristics of the suspension.

2. The suspension as claimed in claim 1 wherein the hydraulic circuit which controls said suspension regulator comprises two electromagnetic valves disposed in series, each having two stable states and cooperating with a centrifugal regulator so that the accumulator and the additional dampers are connected or disconnected depending on the speed of the vehicle and on the energization states of the electromagnetic valves.

3. An oleopneumatic suspension for an automotive vehicle having a front axle with a pair of front wheels and a rear axle with a pair of rear wheels, said suspension comprising:
   a respective suspension cylinder for each of said wheels;
   a respective suspension accumulator hydraulically connected to each of said cylinders;
   a respective suspension damper hydraulically connected between each of said suspension cylinders and the respective suspension accumulator;
   a respective regulator valve for each of said axles, each of said regulator valves having a valve member shiftable between an open position of the respective valve and a closed position thereof;
   a respective flexibility-generating accumulator for each of said axles hydraulically connected to the regulator valve thereof; and
   additional dampers hydraulically connected between each of said regulator valves and the suspension cylinders of the respective axle for connection of the additional dampers of each axle jointly to the respective flexibility-generating accumulator in the open position of the respective regulator valve and for inactivation of the additional dampers and the respective flexibility-generating accumulator in the closed position of the respective regulator valve.

4. The oleopneumatic suspension defined in claim 3 wherein each of said regulator valves is a slide valve whose valve member is displaceable by hydraulic pressure against resilient means, further comprising means for applying the same hydraulic pressure to said valves of both of said axles.

5. The oleopneumatic suspension defined in claim 3 wherein each of said regulator valves is a slide valve whose valve member is displaceable by hydraulic pressure against resilient means, further comprising means for applying said hydraulic pressure to said valves of each of said axles.

6. The oleopneumatic suspension defined in claim 3 wherein each of said axles is provided with a trim corrector for connecting the suspension cylinders of the wheels of the respective axles to a high pressure source and to a reduced pressure source selectively depending on a load on said vehicle, each of said regulator valves being provided with means enabling the respective trim corrector to act on the two cylinders of each axle when the respective flexibility-generating accumulator and the additional dampers are in circuit or out of circuit.

7. The oleopneumatic suspension defined in claim 3 wherein said regulator valves are provided with a hydraulic control circuit, said control circuit including two electromagnetic valves disposed in series, each of said electromagnetic valves having two stable states and cooperating with a centrifugal regulator to shift said valves between said open and closed positions depending on the speed of said vehicle and the energization states of the electromagnetic valves.

8. The oleopneumatic suspension defined in claim 3 wherein said valves are controlled by a hydraulic circuit having an electromagnetic valve controlled by sensors responding to at least one driving parameter selected from braking, acceleration, and steering-wheel rotation, said circuit being provided with manual intervention means for stiffening the suspension.

9. The oleopneumatic suspension defined in claim 3 wherein the regulator valve, flexibility-generating accumulator and additional dampers for each axle are formed in a single structural unit.

* * * * *